(12) United States Patent
Kozyra et al.

(10) Patent No.: US 6,232,676 B1
(45) Date of Patent: May 15, 2001

(54) SAFETY POWER ON/OFF SWITCHING FOR HOT PLUGGABLE CARDS

(75) Inventors: Kazimierz L. Kozyra, Olympia; Parviz P. Rahmany, Newcastle, both of WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/223,810

(22) Filed: Dec. 31, 1998

(51) Int. Cl.$^7$ ........................................... G06F 13/00
(52) U.S. Cl. ..................... 307/113; 307/134; 307/142; 361/686; 361/737; 361/752; 710/103
(58) Field of Search ............................ 361/684, 685, 361/686, 737, 741, 752, 756, 727; 710/102, 103; 307/113, 112, 134, 139, 142

(56) References Cited

U.S. PATENT DOCUMENTS

| | | | |
|---|---|---|---|
| 4,454,552 | * 6/1984 | Barnes et al. | 361/9 |
| 4,835,737 | * 5/1989 | Herrig et al. | 364/900 |
| 5,373,133 | * 12/1994 | Brockway et al. | 200/35 |
| 5,418,404 | * 5/1995 | Araoka et al. | 307/142 |
| 5,754,406 | * 5/1998 | Hardt et al. | 361/756 |
| 5,822,196 | * 10/1998 | Hastings et al. | 361/801 |

* cited by examiner

*Primary Examiner*—Fritz Fleming
*Assistant Examiner*—Roberto Rios
(74) *Attorney, Agent, or Firm*—Antonelli, Terry, Stout & Kraus, LLP (57) ABSTRACT

Disclosed is structure and method for supplying and cutting off power to a removable card component of an electrical device, without interfering with supply of power to other components of the device (including other card components), so that the single card component can be serviced (removed/replaced/added) without interfering with supply of electrical power to other components of the electrical device. The structure includes a slider member on the frame of the device, which slides on the frame between first and second positions on the frame, and a switch actuated by the slider member. In sliding the slider member to the first position, the slider member trips the switch to cut off power only to electrical contacts, of the device, which supply electrical power to the card component, while electrical power supply to other components of the device is maintained; and in sliding the slider member to the second position the slider member trips the switch to supply power to these electrical contacts, to thereby supply power to the card component. In the first position, where power to the card component is cut off, the slider member permits removable access to the card component for servicing of the card component; and in the second position, where power is being supplied, the slider member prevents removable access to the card component for servicing thereof.

39 Claims, 10 Drawing Sheets

SAFETY POWER ON/OFF SWITCHING FOR HOT PLUGGABLE CARDS

FIELD

The present invention is directed to structure, and a method, for hot-swap servicing of a card component.

BACKGROUND

Various electrical devices, including modern computer systems, such as servers, workstations and personal computers, have card components. For example, servers and other computer systems include cards that comply with the Peripheral Component Interconnect (PCI) bus specification, the latest version of which is "PCI Local Bus Specification, Revision 2.1", set forth by the PCI Special Interest Group (SIG) on Jun. 1, 1995. Hereinafter, such cards in compliance with the PCI bus specification (that can be electrically connected to PCI busses complying with the PCI bus specification) are called PCI compliant cards.

In the past, in order to service PCI compliant cards of a server (e.g., add a PCI compliant card, remove a PCI compliant card, or substitute another PCI compliant card for the PCI compliant card, of the server), all operations of the server were shut down, for example, by totally cutting off external electrical power to the server. However, shutting down the entire server caused severe problems. For example, the downtime occurring upon shutting down the server reduced business efficiency and thus increased business costs.

Recently, developments have been made in connection with servers having hot pluggable PCI compliant cards (servers which need not be totally shut down, but instead only having power partially interrupted, only to the specific PCI compliant card serviced). In one proposed system, rocker switches are individually used at the location of each PCI compliant card. For example, when the rocker switch is rotated to rest on top of a PCI compliant card in place in the bay of the server for holding the PCI compliant card, the switch is closed such that power is supplied to the card. When it is desired to service (for example, remove) the card, the rocker switch is rotated to a position in which it does not overlie the PCI compliant card. In this position, in which the card is free of the rocker switch, the rocker switch is open so as to cut off supply of power to the PCI compliant card, while power is still supplied to the remainder of the server (including other PCI compliant cards of the server), and the card can be removed.

However, this technique utilizing the rocker switch has disadvantages. For one thing, it can only be used with servers where the PCI compliant card is insertable/removable via the top of the device. More particularly, the rocker switch technique cannot be utilized in systems where the PCI compliant card is insertable/removable from the rear of the server. Moreover, the rocker switch does not exert sufficient immobilizing force to maintain a stable positioning of the PCI compliant card in the bay of the server for holding the PCI compliant card; that is, in systems utilizing the rocker switch a card holder is required at the rear end of the card (i.e., the end of the card opposite the card end having the support bracket), to stabilize the card in the bay of the server for holding the card.

SUMMARY

The present invention provides, in various embodiments, structure, and methods, providing a hot pluggable card arrangement. Thus, the present invention, in one embodiment, includes chassis structure, of an electrical device, this structure including a frame member, a slider member sliding on the frame member and a switch. The switch switches on and switches off power to an electrical connector for supplying power to a card component of the electrical device, without switching power on and off to other electrical circuitry of the device. The electrical connector is electrically connected to bus structure of the electrical device. This card component is removably supported by the frame member. The slider member trips the switch to turn on and turn off power to the connector, as the slider member slides on the frame member between first and second positions on the frame member.

DETAILED DESCRIPTION

While the invention will be described in connection with specific examples and illustrative embodiments, it will be understood that it is not intended to limit the invention to those examples and illustrative embodiments. To the contrary, it is intended to cover all alterations, modifications and equivalents as may be included within the spirit and scope of the invention as defined by the appended claims.

Exemplary embodiments of the present invention will be described primarily in connection with servers having, for example, PCI compliant cards removable/insertable with respect to a common electrical bus. However, the present invention is not limited thereto; more particularly, it is contemplated that the present invention can be utilized in connection with other computers and other computing devices, and other types of cards, as well as in connection with card components used in other industries (for example, the telecommunications industry), where it is desired to power down electrical power to a card component (power down electrical connectors to the card component) when servicing (for example, substituting, adding or removing) such component, while the remainder of the electrical device (e.g., system) continues operating.

Various examples and embodiments of the present invention, in the following, are described in connection with the various drawings figures. Various components in the drawing figures having corresponding functions are referred to using common reference numerals.

Embodiments of the present invention contemplate structure, and methods, for servicing a removable card component, with electrical power to such card component being able to be selectably shut down while the remainder of the system continues running. Embodiments of the present invention provide such structure and such methods, while also providing good physical retention of the card in the system, without the need for another holder for the card component. The present invention also provides such structure and such methods, while also providing control of access to the frame location supporting the removable card component, to both control supply of power to the removable card component and accessibility to remove/add/replace the card component (e.g., so that access is permitted only in a power-off condition for the card component). Embodiments advantageously provide the ability to have such servicing, without radical redesign of the device, e.g., a small modification utilizing a slot on the frame or other way to retain the slider while permitting appropriate sliding. Embodiments are particularly desirable for servers, because it is desirable to keep the server running even when servicing specific PCI compliant cards in the server, but the present invention is not limited to servers.

Figure 10:
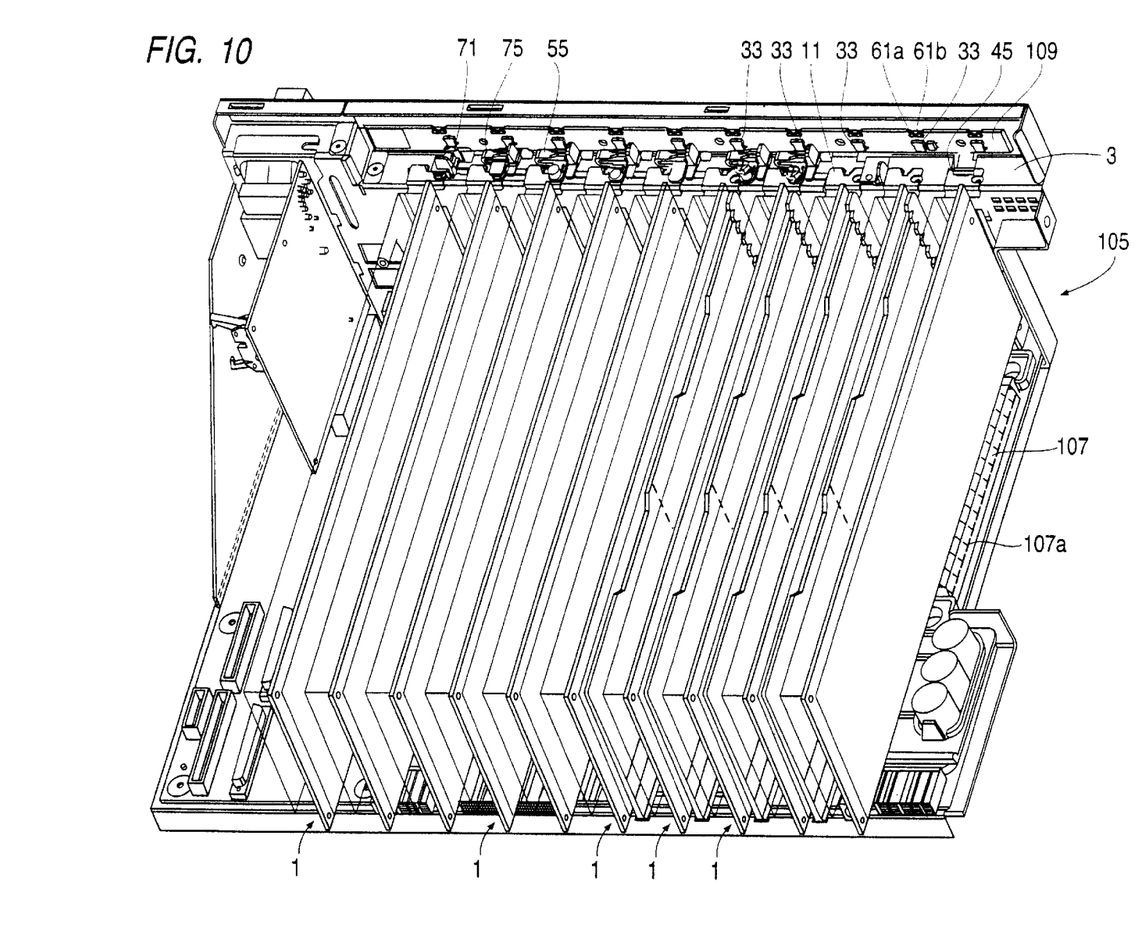
FIG. 10 is a perspective view of an example of a bay of a server for holding a PCI compliant card.

FIG. 10 is a perspective view of an example of a bay of a server for holding PCI compliant cards, with a plurality of PCI compliant cards installed within such bay. Differing ones of the PCI compliant cards are illustrated as being retained using differing examples of the invention, with each example being described in greater detail as follows.

Figure 1:
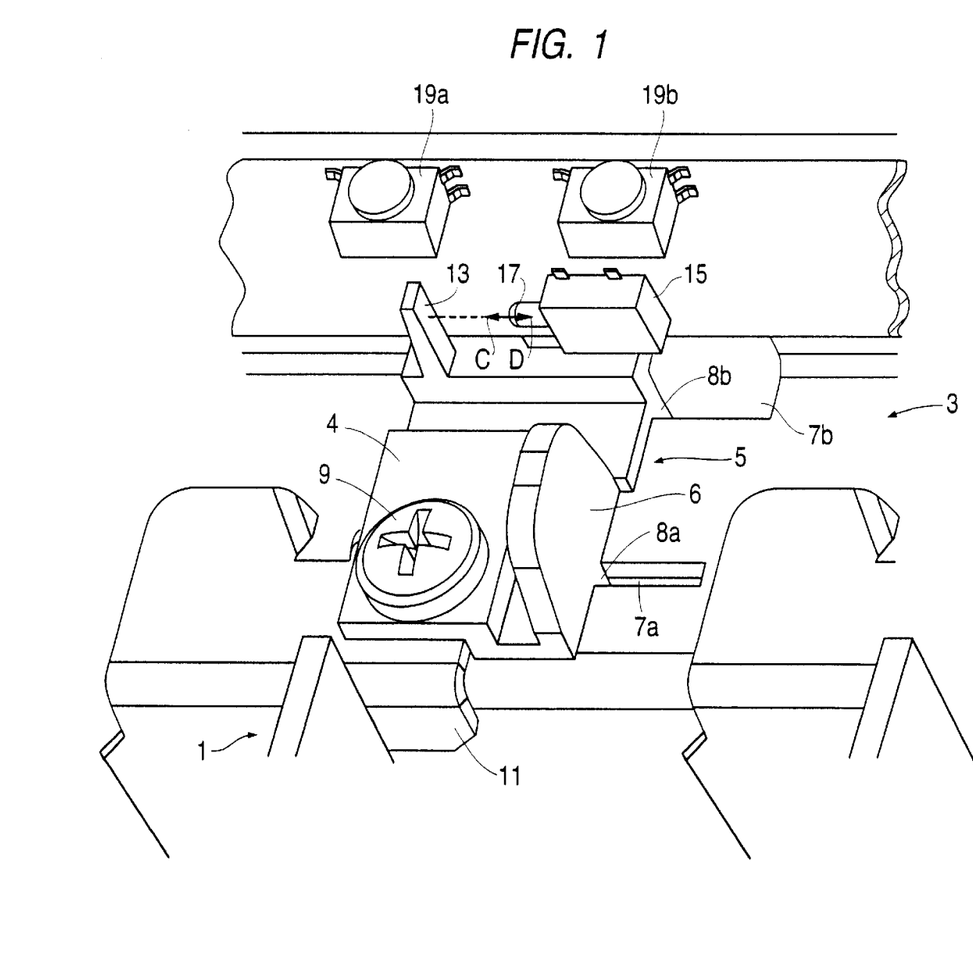
FIG. 1 is a perspective view showing a first example of the present invention, with the switch closed to supply power to a PCI compliant card.
Figure 2:
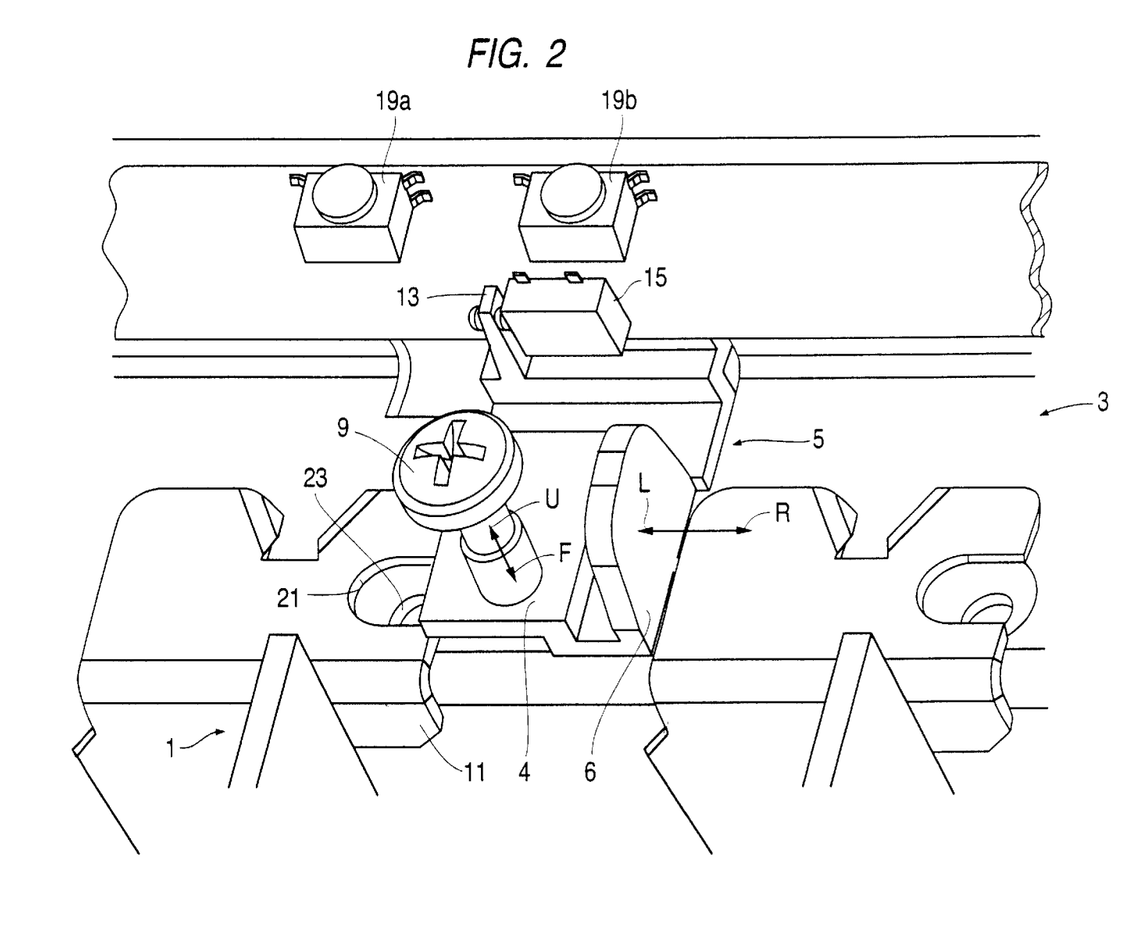
FIG. 2 is a perspective view of this first example of the present invention, with the switch open to cut off power to the PCI compliant card.

More particularly, FIGS. 1 and 2 show a first example of the present invention. These figures show a portion of the bay of the server for holding PCI compliant cards. In this first example, a screw 9 is utilized to fix the L-shaped bracket 11 of the PCI compliant card 1 to the frame member 3. The screw 9 is a captive screw captured (e.g., non-removably attached) on slider member 5. It is desirable to have the screw 9 captive to the slider member 5, rather than being independent thereof, to reduce the potential of the screw falling into the server when removing/inserting the screw 9 for fixing PCI compliant card 1 on the frame member 3.

Slider member 5 includes base structure 4 and an abutment projection 13, which projection 13 works with actuator 17 of switch 15 to trip the switch 15 open or closed (respectively to cut off power and supply power to connectors and hence to the PCI compliant card 1). The actuator 17 is, for example, a spring-loaded plunger which projects/retracts out of/into the body of the switch 15 in directions C-D which connect/disconnect power, respectively, e.g., butting contact between the actuator 17 and projection 13 will cause the actuator 17 to retract into the body of the switch 15 as the slider member 5 is slid. In FIG. 1, projection 13 is spaced from the actuator 17, the switch 15 being tripped closed so that power is supplied to the PCI compliant card 1. The slider member 5 also includes extensions 8a, 8b fitting in slots 7a, 7b in frame member 3 for sliding therealong, to add stability to the slider member 5 when sliding along the frame member 3. Desirably, although not necessary, the slider member 5 also includes a user grasping extension 6 to facilitate sliding of the slider member, e.g., by a person pushing such extension 6 with his or her thumb.

With regard to the specifics of the power connection/disconnection operation provided by the switch 15 (of this and the other embodiments described ahead), numerous alternative arrangements can be utilized. More particularly, as a first example, the switch 15 can be a simple mechanical switch having one or more electrical contacts mechanically coupled to and moved by movement of the actuator 17, to complete or disrupt one or more circuits providing power to the PCI compliant card in accordance with movement of the actuator 17. Alternatively, movement/positioning of the actuator can be mechanically or optically sensed, and such information can be utilized (e.g., by a microprocessor or application specific integrated circuit (ASIC) through appropriate hardware or software programming) to activate/deactivate a relay (not shown) which connects/disconnects power to the PCI compliant card.

While not necessary for this example of the present invention, also shown in FIG. 1 are light emitting diode lamps 19a, 19b, which indicate the status (e.g., valid operation) of the PCI compliant card 1 and when power is being supplied to the PCI compliant card 1, respectively. FIG. 1 shows the screw 9 screwed down into the frame member 3 so as to retain the PCI compliant card 1 by retaining the L-shaped bracket 11 on the frame member 3.

FIG. 2 shows this first example of the present invention, with the slider member 5 being at a position where the PCI compliant card 1 is free to be removed from the frame member 3, and where the actuator of switch 15 is contacted by projection 13 of slider member 5 to trip the switch open (that is, to cut off power to the PCI compliant card 1). Also shown in FIG. 2 is an aperture 23 (e.g., threaded hole) in frame member 3 and a corresponding notch 21 in the L-shaped bracket 11 of the PCI compliant card 1. As can be appreciated from FIGS. 1 and 2, the slider member 5 is slidable so as to cover aperture 23 and notch 21, and captive screw 9 is screwable (or otherwise engageable) into/out of the aperture 23 to retain/release the L-shaped bracket 11 and PCI compliant card 1.

In operation, with the slider member positioned as shown in FIG. 2, the PCI compliant card 1 and L-shaped bracket 11 thereof are positioned so that the notch 21 of the L-shaped bracket 11 aligns with the aperture 23 in the frame member. Thereafter, the slider member 5 is slid over to the left direction L, to a position as shown in FIG. 1, which trips the switch closed to supply power to the PCI compliant card 1. In this position shown in FIG. 1, the screw 9 is aligned with the notch 21 and aperture 23. The captive screw 9 is screwed into the aperture 23 in a fastening direction F for retaining (fastening) the L-shaped bracket 11 (and PCI compliant card 1).

In removing the PCI compliant card 1, the screw 9 is retracted in unfastening direction U from the position as shown in FIG. 1, and thereafter the slider member 5 is slid to the right direction R, to the position shown in FIG. 2. This causes projection 13 to contact switch actuator 17 so as to open the switch 15, and also permits access to the PCI compliant card 1. The PCI compliant card (including the L-shaped bracket 11 thereof) can then be removed (e.g., from a top and/or rear of the server bay), to be, for example, replaced by another PCI compliant card. Since the L-shaped brackets and electrical contacts for the PCI compliant card are standard, substitution of one PCI compliant card for another is facilitated.

While the illustrative slider arrangement above, as an example of the present invention, and also those disclosed in the following, are described as controlling power and removable access with respect to a single card component, such sliders can be alternatively designed to control power and removable access with respect to more than one card component.

Figure 3:
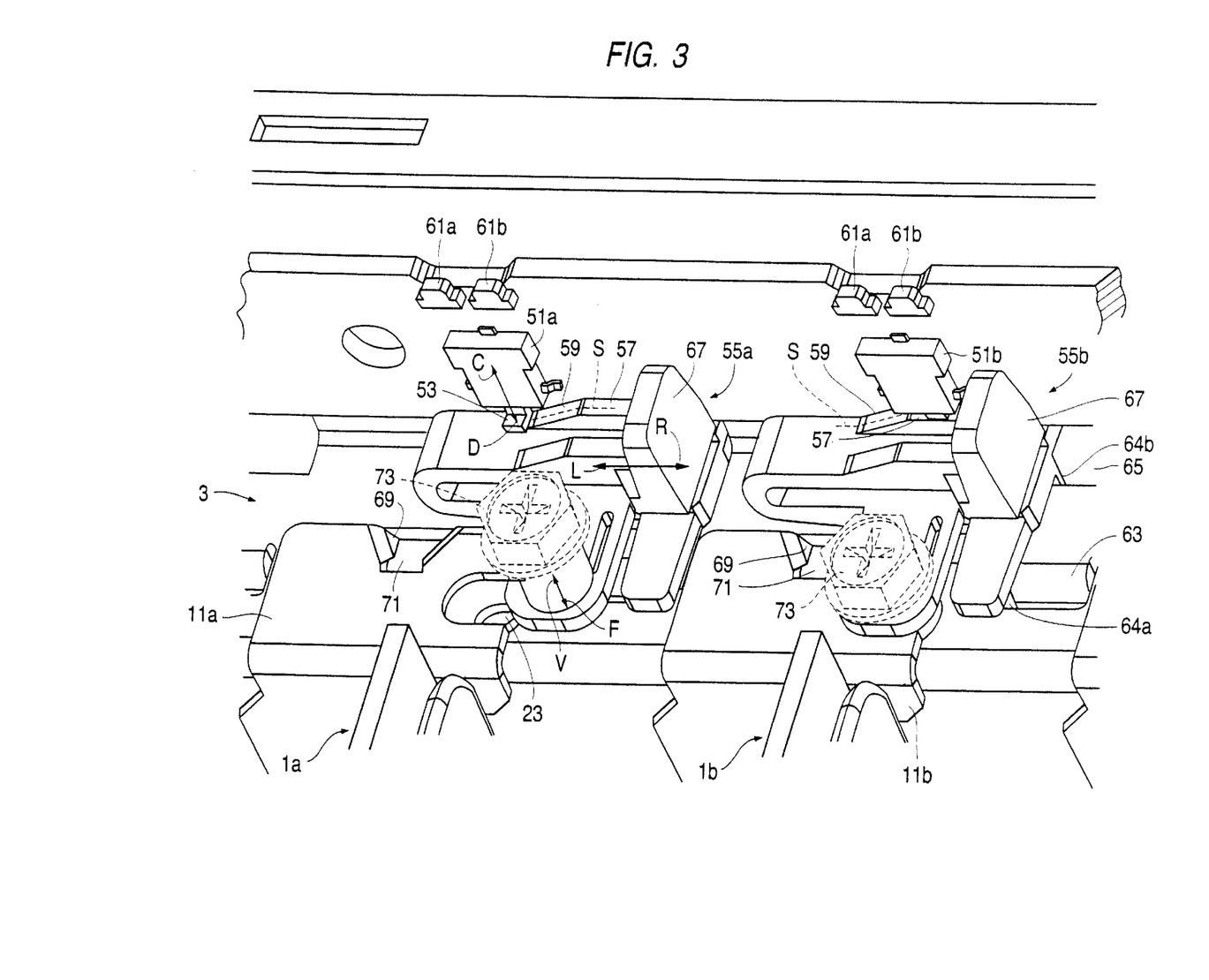
FIG. 3 is a perspective view showing a second example of the present invention.

FIG. 3 shows another example of the present invention, also utilizing a captive screw as discussed previously with respect to the embodiment of FIGS. 1 and 2. FIG. 3 shows two neighboring PCI compliant cards 1a, 1b, respectively with L-shaped brackets 11a, 11b, two slider members 55a, 55b and two switches 51a, 51b, with one slider member and one switch for each PCI compliant card. In FIG. 3, shown for the switch 51a is an actuator 53 extendable/retractable in disconnect/connect directions D/C at the bottom thereof, rather than at the side thereof as in the embodiment in FIGS. 1 and 2. Switch 51b has a corresponding actuator. Each of the slider members 55a, 55b includes a ramped surface 59 and an upper surface 57, defining a sliding path S—S along which the switch actuator rides. In operation, as the slider member 55a of the left-hand structure in FIG. 3 is moved to the left direction L, to a relative right direction R position corresponding to that shown by slider member 55b in the right-hand structure of FIG. 3, the slider member moves to cover aperture 23 in the frame member 3, so that captive screw 73 can be screwed down to retain the L-shaped bracket 11 and PCI compliant card 1. In operation, the slider member 55a moves to the left direction L, and the actuator 53 rides up the ramp surface 59 along the path S—S to the upper surface 57, thereby closing (e.g., retracting or depressing) the switch 51a so as to supply power to the PCI compliant card 1, via slot connectors (not shown) of the electrical device to contacts on the PCI compliant card 1. FIG. 3 also shows light-emitting diodes 61a, 61b having the same respective functions as the light-emitting diodes 19a, 19b in the first embodiment shown in FIGS. 1 and 2, although such diodes are not a necessary component. Each of the slider members 55a, 55b in FIG. 3 also includes a slider grasping extension 67, to facilitate grasping and sliding of the slider members 55a, 55b, although such extension is not a necessary component.

Also shown in FIG. 3 are flange members 69 of the L-shaped bracket 11 fitting in aperture 71 in the frame member 3, to facilitate accurate and stabilized positioning of the L-shaped bracket supported by the frame member.

Shown in the right-hand structure in FIG. 3 are slots 63, 65 in the frame member 3, into which sliding projections 64a, 64b of the slider member 55b are positioned to stabilize sliding of the slider member 55b. Slider member 55a of the left-hand structure in FIG. 3 includes corresponding projections, fitting into corresponding slots, as in the right-hand structure in FIG. 3, but this structure in the left-hand structure is hidden due to the positioning of slider member 55a in FIG. 3.

In the first two examples and illustrative embodiments according to the present invention, the screw utilized to fasten the PCI compliant card to the frame member is captive to the slider member 5. However, the screw need not be captive to the slider member 5. More specifically, FIGS. 4 and 5 respectively show third and fourth examples of the present invention, wherein the screw is not captive to the slider member.

Figure 4:
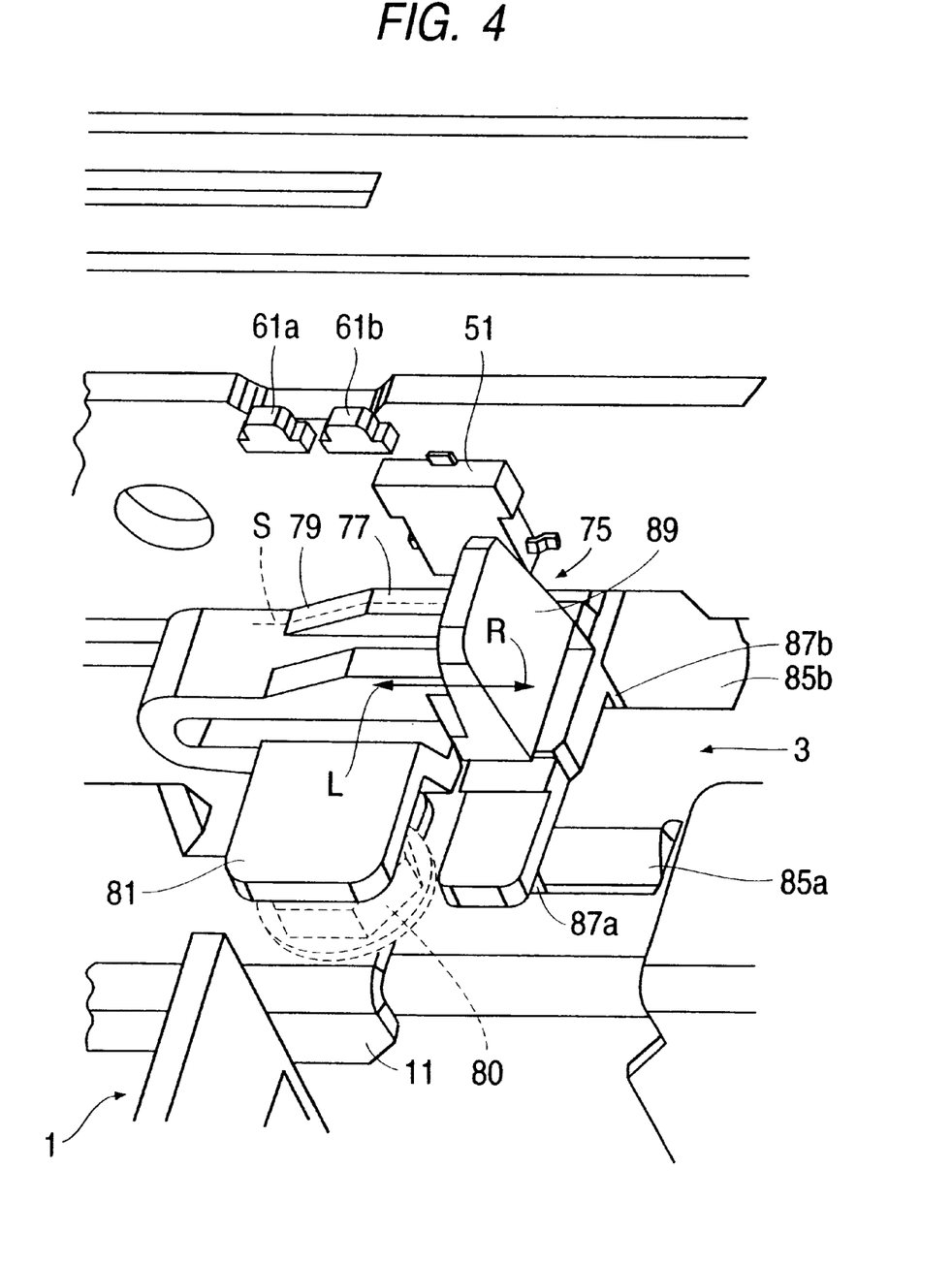
FIG. 4 is a perspective view showing a third example of the present invention.

More particularly, the embodiment shown in FIG. 4, switch 51 is shown, which has an actuator (not shown) which interacts with a ramp surface 79 and an upper surface 77 of the slider member 75, to trip the switch 51 on or off. In FIG. 4, the positioning of the slider member 75 is such that the switch would be tripped closed to supply power to the PCI compliant card 1. As seen in FIG. 4, the slider member 75 also includes grasping projection 89 to facilitate sliding of the slider member 75, by grasping and/or pushing on this projection 89 by a person's thumb or finger. Also shown in FIG. 4 are slots 85a, 85b in the frame member 3 and sliding projections 87a and 87b of the slider member 75 in these slots, to facilitate stable positioning and sliding of the slider member 75, as discussed previously.

As shown in FIG. 4, the slider member includes screw cover portion 81 which overlies screw 80 when screw 80 has fastened the L-shaped bracket 11 of PCI compliant card 1 on the frame member 3. As can be appreciated, with screw cover portion 81 in position as shown in FIG. 4, power is being supplied to the PCI compliant card 1; further access to the screw 80 is not permitted (e.g., is obstructed) so that the screw 80 cannot be removed, and the PCI compliant card 1, correspondingly, cannot be removed. For removing PCI compliant card 1, initially slider member 75 is slid to the right in FIG. 4, exposing screw 80 to make screw 80 accessible for removal. The screw can then be removed, and the PCI compliant card 1, including L-shaped bracket 11, lifted up for removal or replacement. In sliding the slider member to the right direction R in FIG. 4, the actuator of switch 51 rides along sliding path S—S on upper surface 77 and then ramp surface 79 of slider member 75, to open switch 51 and cut off power to PCI compliant card 1. Thus, power shutdown to the PCI compliant card 1 occurs and also the PCI compliant card 1 is accessible for removal.

Figure 5:
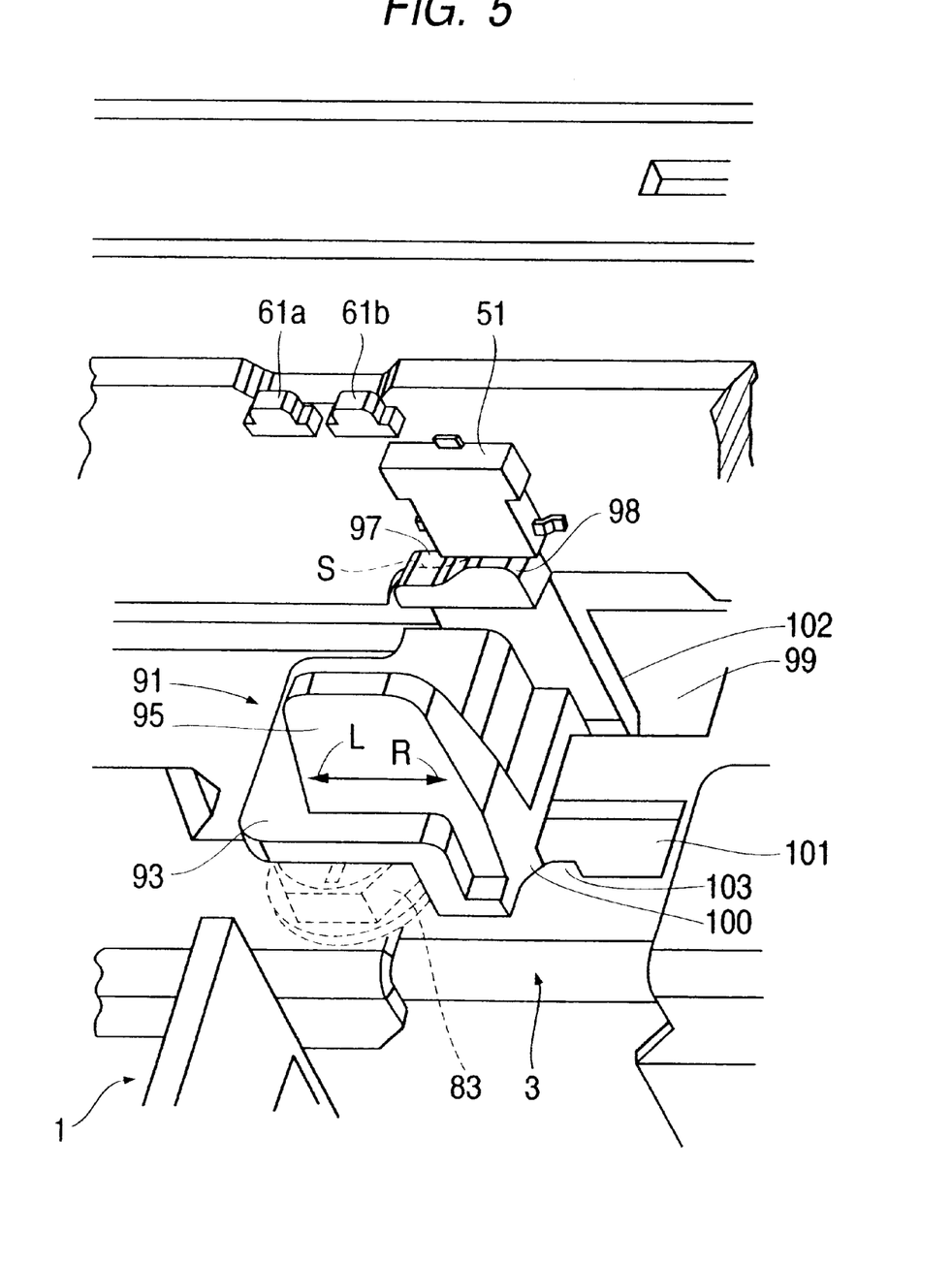
FIG. 5 is a perspective view showing a fourth example of the present invention.

FIG. 5 shows another example and illustrative embodiment of the present invention, having slider member 91. The slider member 91 includes a screw cover portion 93 which covers screw 83 when the slider member 91 is positioned to have tripped the switch 51 closed. In the position of the slider member 91 shown in FIG. 5, power is being supplied to the PCI compliant card 1 and access to the screw 83 is prevented, due to the screw cover portion 93.

Also shown in FIG. 5 are slots 99 and 101 in the frame member 3, in which are positioned elements 100, 102 to facilitate sliding of the slider member 91. Also to facilitate sliding of the slider member 91 is the upward extending grasping projection 95, which can be grasped by an operator and, e.g., pushed to slide the slider member 91 in the left/right directions L/R in FIG. 5.

Also shown in FIG. 5 is locking projection 103 forming part of the slot-forming surface for slot 101. Due to this locking projection 103, the slider member 91 can be locked on the frame member at each side of the locking projection 103, to avoid unintended movement of the slider member 91. Thus, in the embodiment shown in FIG. 5, the portion of the slider member 91 closest to the PCI compliant card 1 can be pushed back toward the switch 51, by pushing extension 95, freeing the projection 100 of the slider member 91 from the locking projection 103, with the slider member 91 then being slid to the right direction R and released so as to be locked along the slot-forming surface of slot 101 to the right (in FIG. 5) of the locking projection 103. Projection 102 of the slider member 91 provides an elasticity or give to the slider member 91 to accommodate snapping over projection 100 in slot 101 from the locking projection 103, so that the slider member 91 can be slid in the right direction R in slots 99, 101, and then retained to the right of locking projection 103, after pushing on extension 95 is stopped.

The slider member 91 also includes surface 97, which co-acts with switch actuator 98 of switch 51 to trip the switch open or closed. In FIG. 5, the switch is tripped closed, to supply power to the appropriate connector and hence to PCI compliant card 1.

Figure 6:
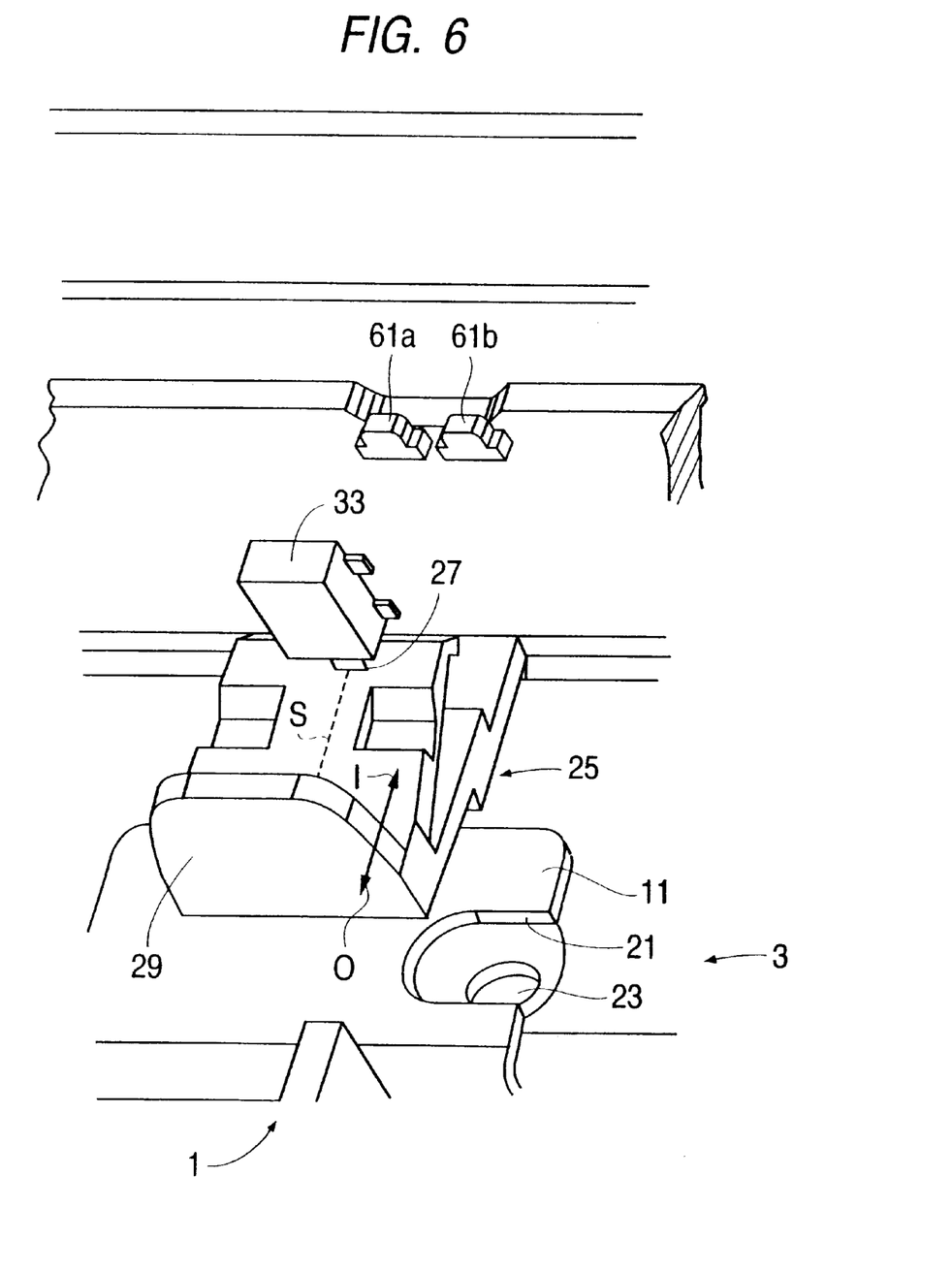
FIGS. 6 and 7 are perspective views showing a fifth example of the present invention, with FIG. 6 showing the slider member having tripped the switch closed to supply power to the PCI compliant card, and with FIG. 7 showing the slider member having tripped the switch open to cut off power to the PCI compliant card.
Figure 7:
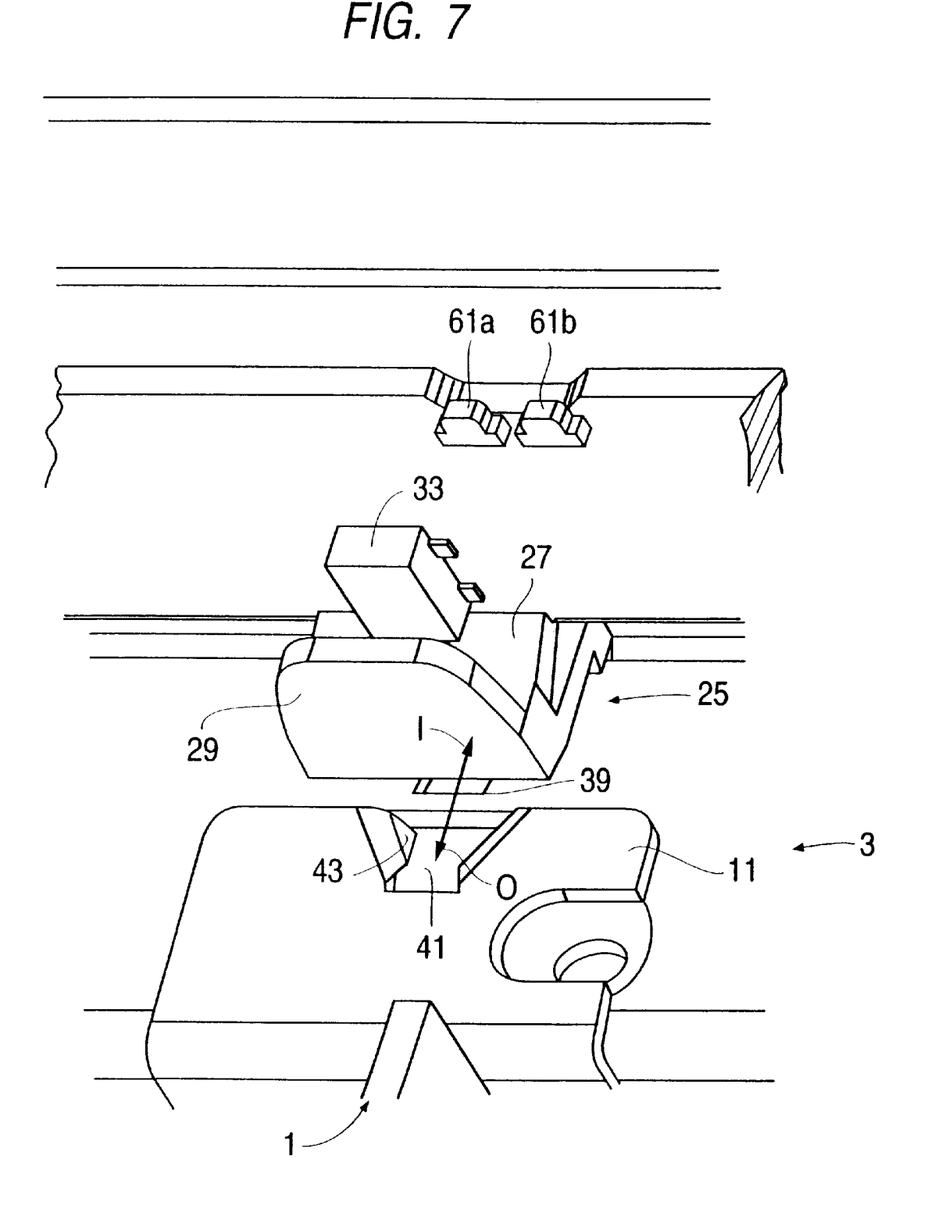
Figure 8:
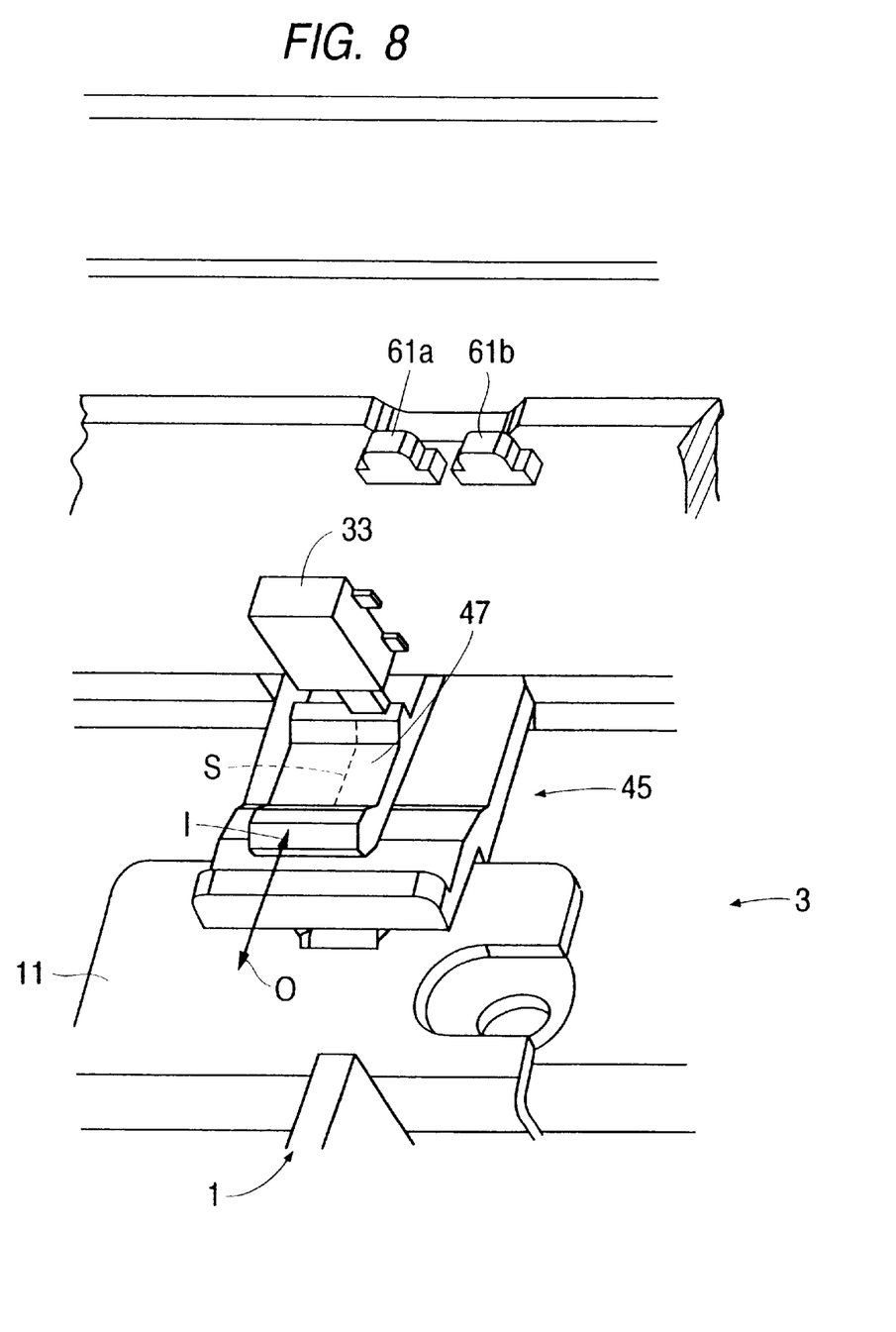
FIGS. 8 and 9 are perspective views of a sixth example of the present invention, with FIG. 8 showing the slider member having tripped the switch closed to supply power to the PCI compliant card, and with FIG. 9 showing the slider member having tripped the switch open to cut off power to the PCI compliant card.
Figure 9:
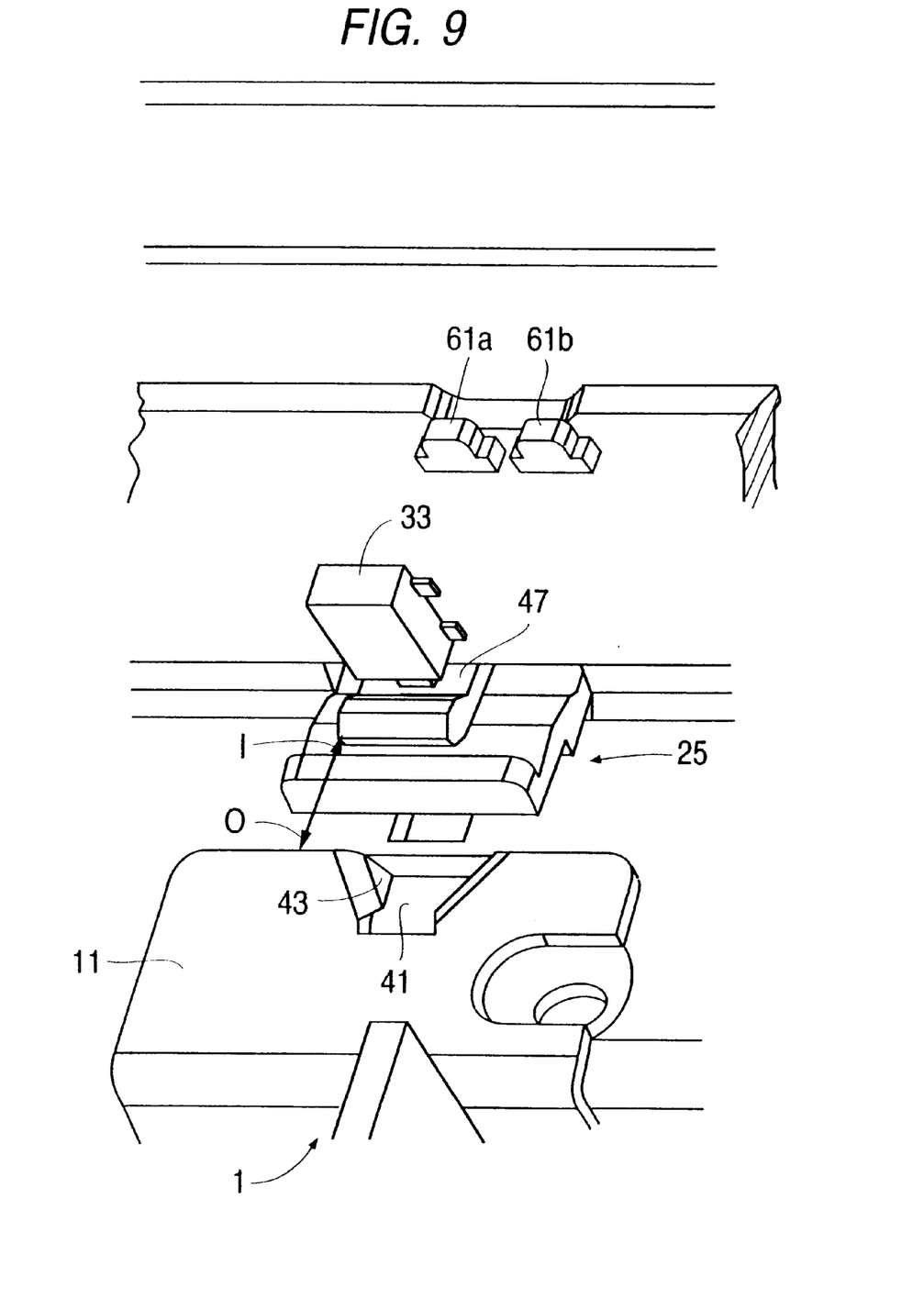

FIGS. 6–9 show two additional examples and illustrative embodiments of the present invention, wherein the L-shaped bracket 11 of the PCI compliant card 1 can be retained on the frame member 3 by the slider member, without the need of a screw or other additional fastener. More particularly, FIGS. 6 and 7 show one example without the use of a screw, and FIGS. 8 and 9 show another example.

In the embodiment shown in FIGS. 6 and 7, the switch 33 has an actuator extending from the bottom thereof, and riding on top surface 27 of slider member 25 along path S. In this embodiment shown in FIGS. 6 and 7, the slider member slides in inward/outward directions I/O extending between the switch 33 and L-shaped bracket 11, rather than in a left/right direction, perpendicular to the inward/outward directions, as in previous embodiments. In the structure shown in FIGS. 6 and 7, the slider member 25 rides in slot 39 (see FIG. 7) in the frame member 3. The back of the top surface 27 of the slider member 25 is higher than the front (e.g., is ramped or inclined; the front being closest to projecting portion 29 of the slider member 25), so that the switch is tripped closed when the slider member is in the position shown in FIG. 6 and is tripped open in the position shown in FIG. 7. The L-shaped bracket includes flange 43, which fits in aperture 41 of the frame member 3 so as to stabilize positioning of the L-shaped bracket (and PCI compliant card 1) on the frame member 3. When the slider member 25 is positioned as shown in FIG. 6, the L-shaped bracket 11 (and PCI compliant card 1) are retained solely through use (e.g., friction) of the slider member 25, without the need of, e.g., a screw.

The example and illustrative embodiment of FIGS. 8 and 9 is similar to that of FIGS. 6 and 7, but the slider member 45 has a different upper surface (that is, upper surface 47) than that shown in the embodiment of FIGS. 6 and 7. In FIG. 8, the slider member 45 is shown positioned both to retain the L-shaped bracket 11 and PCI compliant card 1 and to trip the switch 33 to supply power to the PCI compliant card; in FIG. 9, the PCI compliant card is free to be removed (e.g., moved vertically from the position on the frame member 3) with the switch being tripped (by the actuator on the upper surface 47 of slider member 45) open so as to cut off supply of power to the PCI compliant card 1.

FIG. 10 shows a PCI bay 105 of a server, with a plurality of PCI compliant cards 1 having L-shaped brackets 11 on frame member 3. As seen in FIG. 10, the PCI compliant cards 1, 1, etc., respectively have a slider member, a switch 33 and light emitting diodes 61a, 61b associated therewith. FIG. 10 shows bay 105 of the server, for holding the PCI compliant cards 1,1, etc., with various different types of slider members (e.g., slider members 75, 45, 55a and 55b (see reference character 55 in FIG. 10), and 91) from the previously discussed embodiments. However, as can be appreciated, the bay for holding the PCI compliant cards can include a similar type of slider member for each of the positions for PCI compliant cards.

Also shown in FIG. 10 is a housing 107 having a slot therein and connectors 107a of, e.g., bus structure of the server, within the housing for contacting electrical contacts on the PCI compliant card 1.

As seen in FIG. 10, the switches and light emitting diodes are provided on an elongated printed circuit board 109 provided on the frame member 3.

In all of the foregoing embodiments, the light emitting diodes and switches can be of any suitable structure. The slider member can be made, for example, of plastic which can easily slide on the frame member of the server, or any other material which can slide easily on the frame member and provide functions as discussed previously. The frame member is made of any suitable material, and having appropriate slots in which the slider members can slide.

Embodiments of the present invention will be described generally in connection with various additional aspects thereof, in the following. As can be appreciated, the present invention is not limited to these aspects or embodiments, but embraces all aspects or embodiments as covered by the appended claims and equivalents thereof.

At the first position of the slider member, the aforementioned switch is open to cut off power to the connector, and at the second position the switch is closed to turn on power to this connector. While not to be limited thereto, the card component removably supported by the frame member and electrically connected to the connector can be a PCI compliant card; and the frame member can form a bay, of a server, for holding the PCI compliant card.

Desirably, as an additional aspect or embodiment, at the first position of the slider member, where the switch is open to cut off power to the connector and card component connected thereto, the slider member permits access to the location for supporting the card component by the frame member, for removal or adding of a card component. Thus, at this first position access is permitted when the slider member has tripped the switch to cut off power to the connector. At the second position of the slider member, where the switch has been tripped to supply power to the electrical connector and hence to the card component, the slider member blocks access to the location for supporting the card component by the frame member, to prevent removal or adding of the card component; thus, at the second position, access is blocked when the slider member has tripped the switch to supply power to the connector. According to this aspect of this embodiment of the present invention, the positioning of the slider member (which is mounted to and slides on the frame member) both controls access to the location for supporting the card component (e.g., the location of the frame member supporting the PCI compliant card) for removal or adding of the card component, and controls supply of power to the card component.

As a further aspect of an embodiment of the present invention, the chassis structure can include a plurality of the connectors, a plurality of the aforementioned slider members respectively associated with the plurality of connectors, with a slider member associated with a respective connector, and a plurality of switches respectively associated with the plurality of connectors, with a switch being associated with the aforementioned respective connector. The plurality of connectors can respectively have a plurality of removable card components electrically connected thereto. This switch associated with the respective connector supplies power to and cuts off power to the respective connector, without interfering with supply of power to other connectors. The slider member associated with the respective connector slides on the frame member between the aforementioned first and second positions on the frame member, to trip this switch associated with the aforementioned respective connector, as discussed previously.

As a still additional aspect of an embodiment of the present invention, there is a server comprising a frame member, a plurality of connectors within the frame member, for electrically connecting to a plurality of removable PCI compliant cards, a plurality of slider members sliding on the frame member, respectively associated with the plurality of connectors, and a plurality of switches, respectively associated with the plurality of connectors. The connectors are electrically connected to bus structure of the electrical device. A PCI compliant card is to be electrically connected to a respective connector, and a slider member and switch are also associated with this respective connector. This switch supplies power to and cuts off power to this respective connector (and hence to this PCI compliant card) without interfering with supply of power to other connectors (and, correspondingly, to other PCI compliant cards). The slider member associated with this respective connector slides on the frame member between the aforementioned first and second positions on the frame member, as discussed previously, and trips this switch.

As a still further aspect of an embodiment of the present invention, a method of servicing a card component of an electrical device is provided, without interfering with supply of electrical power to other electrical components (including other card components) of the electrical device. This method includes positioning the card component on a frame of the device, with electrical contacts of the card component contacting electrical connectors of the electrical device, a slider member on the frame being in a first position on the frame such that the card component can be positioned on the frame. The electrical connectors of the electrical device, e.g., are electrically connected to bus structure of the electrical device. An electrical switch, for controlling supply of electrical power only to the electrical connectors of the electrical device which contact the card component, is open (that is, power supply to the card component is cut off) when the slider member is in this first position. After the step of positioning, the slider member is then slid along the frame to a second position on the frame, wherein in sliding the slider member to this second position the slider member trips the switch closed, to supply electrical power to the electrical connectors of the electrical device which contact electrical contacts of the card component.

In a still further aspect of an embodiment of the present invention, there is a method of removing a card component from an electrical device, while the electrical device is still operating, the card component being supplied electrical power by way of electrical connectors of the electrical device. The electrical connectors of the electrical device, e.g., are electrically connected to bus structure of the electrical device. The method includes sliding a slider member along a frame of the electrical device from a second position on the frame to a first position on the frame, where in sliding the slider member to this first position the slider member trips a switch open to cut off electrical power only to electrical connectors of the electrical device which supply power to the card component. The method further includes removing the card component from the electrical device when the slider member is in this first position.

Accordingly, by the present invention, structure and method embodiments are provided whereby PCI compliant cards, in a bay of a server for holding PCI compliant cards, can easily be serviced in a power-off condition, without shutting down the entire server, while avoiding the need of additional structure for retaining the PCI compliant card, and without a need of a radical redesign of the server structure (including the frame thereof). Moreover, access to the location of the PCI compliant card, for adding, removing and replacement of the PCI compliant card, can be controlled while controlling supply of power. That is, the examples and illustrative arrangements of the present invention, at minimum, can provide dual operations of connecting/disconnecting power to the PCI compliant cards, and retaining/releasing of the PCI compliant cards.

While there have been shown and described several embodiments in accordance with the present invention, it is understood that the same is not limited thereto, but is susceptible of numerous changes and modifications as known to those skilled in the art. Therefore, the invention is not limited to the details shown and described herein, but intent is to cover all such changes and modifications as are encompassed by the scope of the appended claims, including equivalents thereof.

We claim:

1. Chassis structure of an electrical device, comprising:
a frame member;
a slider member capable of sliding on the frame member; and
a switch, which is adapted to switch on and switch off supply of power to an electrical connector for mounting a card component of the electrical device, without switching power on and off to other electrical circuitry of the electrical device, said connector being adapted to electrically connect to the card component removably supported by the frame member,
wherein the slider member is adapted to trip said switch to switch on and switch off power to said electrical connector, when the slider member slides between a first position on the frame member and a second position on the frame member.

2. Chassis structure according to claim 1, wherein the frame member comprises a frame member of a server.

3. Chassis structure according to claim 1, wherein the first position is a position which permits access to said card component from said frame member and at which the slider member has tripped the switch to cut off power to said connector; and the second position is a position which blocks removable access to said card component and at which the slider member has tripped the switch to supply power to the connector.

4. Chassis structure according to claim 3, wherein the slider member locks at said first position and locks at said second position, and slides between the first and second positions without locking therebetween.

5. Chassis structure according to claim 1, wherein the frame member includes a screw hole, and wherein in said first position the slider member does not cover the screw hole, and in the second position the slider member covers the screw hole.

6. Chassis structure according to claim 5, further comprising a screw, in said screw hole, for removably fastening the card component to the frame member; and wherein said slider member, in said second position, covers said screw.

7. Chassis structure according to claim 1, wherein said card component is removably fastened to the frame member using a fastener, and in the second position access to said fastener is blocked.

8. Chassis structure according to claim 1, wherein the frame member includes a screw hole and the slider member includes a captive screw, and in the first position the captive screw is positioned at the screw hole and in the second position the captive screw is positioned at a location separated from the screw hole.

9. Chassis structure according to claim 1, wherein the slider member has a part which, at the second position, covers a portion of the card component to prevent removal of the card component, and, at the first position, leaves said portion of the card component uncovered.

10. Chassis structure according to claim 9, wherein said part of the slider member, when located at the second position, retains the card component against the frame member.

11. Chassis structure according to claim 1, wherein said slider member is mounted on said frame member.

12. Chassis structure according to claim 1, wherein said switch is mounted on said frame member.

13. Chassis structure, comprising:
a frame member;
a plurality of connectors within the frame member, for respectively electrically connecting bus structure to a plurality of card components, a card component to be associated with a respective connector, the plurality of card components being removably supported by the frame member;
a plurality of slider members capable of sliding on the frame member, respectively associated with the plurality of connectors, with a slider member associated with the respective connector; and
a plurality of switches, respectively associated with the plurality of connectors, with a switch being associated with the respective connector to supply power to and to cut off supply of power to the respective connector without interfering with supply of power to other connectors,
wherein the slider member associated with the respective connector is adapted to trip the switch to supply and cut off supply of power to the respective connector, when the slider member slides between a first position on the frame member and a second position on the frame member, the first position being a position which permits access to said card component for removal of the card component from said frame member and at which the slider member has tripped the switch to cut off power to said respective connector, and the second position being a position which blocks access to said card component to prevent removal of said card component and at which the slider member has tripped the switch to supply power to the respective connector.

14. Chassis structure according to claim 13, wherein said plurality of connectors are connectors for providing electrical connection to PCI compliant cards.

15. Chassis structure according to claim 14, wherein said frame member forms a bay, of a server, for holding PCI compliant cards.

16. Chassis structure according to claim 13, wherein said plurality of slider members are mounted on said frame member.

17. Chassis structure according to claim 13, wherein said plurality of switches are mounted on said frame member.

18. Chassis structure according to claim 13, wherein the plurality of connectors are mounted on the frame member.

19. A server, comprising:
a frame member;
a plurality of connectors within the frame member, for electrically connecting to a plurality of removable PCI compliant cards, a PCI compliant card to be associated with a respective connector;
a plurality of slider members capable of sliding on the frame member, respectively associated with the plurality of connectors, with a slider member associated with the respective connector; and
a plurality of switches, respectively associated with the plurality of connectors, with a switch being associated with the respective connector, said switch, of the plurality of switches, supplying power to and cutting off supply of power to the respective connector without interfering with supply of power to other connectors,
wherein the slider member associated with the respective connector is adapted to trip the switch to supply and cut off power to the respective connector when the slider member slides between a first position on the frame member and a second position on the frame member, the first position being a position which permits access to said PCI compliant card for removal of said PCI compliant card from said frame member and at which the slider member has tripped the switch to cut off power to said respective connector, and the second position being a position which blocks access to said PCI compliant card to prevent removal of said PCI compliant card from said frame member and at which the slider member has tripped the switch to supply power to the respective connector.

20. Server according to claim 19, further comprising a PCI compliant card, supported on the frame member and electrically connected to the respective connector, and wherein the PCI compliant card includes an L-shaped bracket as a front panel of the card, the L-shaped bracket being supported on the frame member.

21. Server according to claim 20, wherein the slider member associated with the respective connector, in the second position, covers part of the L-shaped bracket to prevent vertical movement of the PCI compliant card.

22. Server according to claim 20, wherein the slider member retains the PCI compliant card supported on the frame member.

23. Server according to claim 19, wherein said plurality of slider members are mounted on said frame member.

24. Server according to claim 19, wherein said plurality of switches are mounted on said frame member.

25. Server according to claim 19, wherein the plurality of connectors are mounted on the frame member.

26. A method of servicing a card component of an electrical device, comprising:
positioning the card component on a frame of the device, with electrical contacts of the card component contacting electrical connectors of the electrical device, a slider member on the frame being in a first position on the frame such that the card component can be positioned on the frame, and wherein an electrical switch, for controlling supply of electrical power only to the electrical connectors of the electrical device which contact the card component, is open when the slider member is in the first position; and
after said positioning, sliding the slider member along the frame to a second position on the frame, wherein in sliding the slider member to said second position the slider member trips the switch closed, to supply electrical power to the electrical connectors of the electrical device which contact electrical contacts of the card component.

27. The method according to claim 26, wherein when the slider member is in the second position access to the card component for removal thereof from the electrical device is blocked.

28. The method according to claim 26, wherein said electrical device is a server, and said card component is a PCI compliant card.

29. The method according to claim 26, further comprising:
sliding the slider member along the frame back to said first position on the frame, wherein in sliding the slider member back to said first position the slider member trips the switch open to cut off supply of electrical power only to the electrical connectors of the electrical device which supply power to the card component; and
after sliding the slider member back to said first position, removing the card component from the electrical device when the slider member is in the first position.

30. A method of removing a card component from an electrical device, comprising:

sliding a slider member along a frame of the electrical device from a second position on the frame to a first position on the frame, wherein in sliding the slider member to said first position the slider member trips a switch open to cut off electrical power supply only to electrical connectors of the electrical device which supply power to the card component; and removing the card component from the electrical device when the slider member is in the first position.

31. Chassis structure of an electrical device, comprising:

a frame member;

an electrical connector, for mounting a card component of the electrical device;

a slider member capable of sliding on the frame member; and a switch, which is adapted to switch on and switch off supply of power to the electrical connector for mounting the card component of the electrical device, without switching power on and off to other electrical circuitry of the electrical device, said electrical connector being adapted to electrically connect to the card component, said card component being removably supported by the frame member, wherein the slider member is adapted to trip said switch to switch on and switch off power to said electrical connector, when the slider member slides between a first position on the frame member and a second position on the frame member.

32. Chassis structure according to claim 31, wherein said electrical connector comprises a connector for providing electrical connection to a PCI compliant card.

33. Chassis structure according to claim 32, wherein said frame member forms a bay of a server for holding a PCI compliant card.

34. Chassis structure according to claim 31, wherein said electrical connector is mounted on said frame member.

35. Chassis structure comprising:

a frame member;

a plurality of connectors within the frame member, for respectively electrically connecting to a plurality of card components, a card component to be associated with a respective connector, the plurality of card components being removably supported by the frame member;

a plurality of slider members capable of sliding on the frame member, respectively associated with the plurality of connectors, with a slider member associated with the respective connector; and a plurality of switches, respectively associated with the plurality of connectors, with a switch being associated with the respective connector to supply power to and to cut off supply of power to the respective connector without interfering with supply of power to other connectors, wherein each of the plurality of connectors is associated with a respective slider member, of the plurality of slider members, and a respective switch, of the plurality of switches, and can electrically connect to a removable card component, wherein the slider member associated with the respective connector is adapted to trip the switch to supply and cut off power to the respective connector, when the slider member slides between a first position on the frame member and a second position on the frame member, the first position being a position which permits access to said card component for removal of the card component from said frame member and at which the slider member has tripped the switch to cut off power to said respective connector, and the second position being a position which blocks access to said card component to prevent removal of said card component and at which the slider member has tripped the switch to supply power to the respective connector.

36. Apparatus comprising:

(1) chassis structure, the chassis structure including:

a frame member;

a plurality of connectors within the frame member, for respectively electrically connecting to peripheral component interconnect compliant cards, a peripheral component interconnect compliant card to be associated with a respective connector, the cards being removably supported by the frame member, wherein said plurality of connectors are connectors for providing electrical connection to the peripheral component interconnect compliant cards;

a plurality of slider members capable of sliding on the frame member, respectively associated with the plurality of connectors, with a slider member associated with the respective connector; and a plurality of switches, respectively associated with the plurality of connectors, with a switch being associated with the respective connector to supply power to and to cut off supply of power to the respective connector without interfering with supply of power to other connectors, wherein the slider member associated with the respective connector is adapted to trip the switch to supply and cut off power to the respective connector, when the slider member slides between a first position on the frame member and a second position on the frame member, the first position being a position which permits access to said peripheral component interconnect compliant card for removal of the card from said frame member and at which the slider member has tripped the switch to cut off power to said respective connector, and the second position being a position which blocks access to said card to prevent removal of said card and at which the slider member has tripped the switch to supply power to the respective connector, and (2) a plurality of the peripheral component interconnect compliant cards.

37. Apparatus comprising:

(1) chassis structure, the chassis structure including:

a frame member;

a plurality of connectors within the frame member, for respectively electrically connecting to a plurality of card components, a card component to be associated with a respective connector, the plurality of card components to be removably supported by the frame member;

a plurality of slider members capable of sliding on the frame member, respectively associated with the plurality of connectors, with a slider member associated with the respective connector; and a plurality of switches, respectively associated with the plurality of connectors, with a switch being associated with the respective connector to supply power to and to cut off supply of power to the respective connector without interfering with supply of power to other connectors, wherein the slider member associated with the respective connector is adapted to trip the switch to supply and cut off power to the respective connector, when the slider member slides between a first position on the frame member and a second position on the frame member, the first position being a position which permits access to said card component for removal of the card component from said frame member and at which the slider member has tripped the switch to cut off power to said respective connector, and the second position being a position which blocks access to said card component to prevent removal of said card component and at which the slider member has tripped the switch to supply power to the respective connector, and (2) a plurality of card components supported by said frame member and being associated respectively with said connectors and electrically connected thereto.

38. Apparatus comprising:
(1) chassis structure of an electrical device, the chassis structure including:
a frame member which forms a bay of a server for holding a peripheral component interconnect compliant card;
a slider member capable of sliding on the frame member;
an electrical connector, for mounting a peripheral component interconnect compliant card of the electrical device, said electrical connector providing electrical connection to the peripheral component interconnect compliant card; and
a switch, which is adapted to switch on and switch off supply of power to the electrical connector for mounting the peripheral component interconnect compliant card of the electrical device, without switching power on and off to other electrical circuitry of the electrical device, said connector being adapted to electrically connect to the card removably supported by the frame member,
wherein the slider member is adapted to trip said switch to switch on and switch off power to said electrical connector, when the slider member slides between a first position on the frame member and a second position on the frame member, and (2) a peripheral component interconnect compliant card supported by said frame member and being associated with said connector and electrically connected thereto.

39. Apparatus comprising:
(1) chassis structure of an electrical device, including:
a frame member;
a slider member capable of sliding on the frame member;
an electrical connector for mounting a card component of the electrical device; and
a switch, which is adapted to switch on and switch off supply of power to the electrical connector for mounting the card component of the electrical device, without switching power on and off to other electrical circuitry of the electrical device, said connector being adapted to electrically connect to the card component removably supported by the frame member,
wherein the slider member is adapted to trip said switch to switch on and switch off power to said electrical connector, when the slider member slides between a first position on the frame member and a second position on the frame member, and (2) a card component supported by said frame member and being associated with said connector and electrically connected thereto.

* * * * *